Aug. 23, 1966  R. J. SNEEDEN  3,267,676
FUEL BURNER STRUCTURE

Filed June 23 1965  3 Sheets-Sheet 1

INVENTOR.
RALPH J. SNEEDEN
BY *Victor D. Behn*
ATTORNEY

Aug. 23, 1966  R. J. SNEEDEN  3,267,676
FUEL BURNER STRUCTURE

Filed June 23 1965  3 Sheets-Sheet 3

INVENTOR.
RALPH J. SNEEDEN
BY
ATTORNEY

United States Patent Office 3,267,676
Patented August 23, 1966

3,267,676
FUEL BURNER STRUCTURE
Ralph J. Sneeden, Woodcliff Lake, N.J., assignor to Curtiss-Wright Corporation, a corporation of Delaware
Filed June 23, 1965, Ser. No. 466,346
10 Claims. (Cl. 60—39.74)

This invention relates to gas turbine engines and is particularly directed to an improved combustion unit for such engines.

Fuel is introduced into the combustion chamber of gas turbine engine generally either by means of fuel spray discharge systems or by fuel vaporizing systems. As compared to a fuel spray nozzle system, fuel vaporizing systems have numerous advantages including greater stability of combustion over a wider fuel range, more efficient combustion, shorter required length of the primary combustion zone for complete combustion and a more uniform temperature distribution in the combustion gases. However fuel vaporizing systems have the disadvantage that the fuel vaporizing tubes are exposed to the burning combustion gases and therefore if said tubes are not properly cooled by the incoming fuel such tubes may burn out.

An object of this invention resides in the provision of a new and improved fuel vaporizing combustion unit for gas turbine engines in which danger of the fuel tubes burning out is minimized.

A futher object of the invention resides in the provision of a combustion unit having an improved fuel vaporizer tube construction.

Another object of the invention comprises the provision of a novel and improved arrangement of a plurality of fuel vaporizing tubes and a plurality of air baffle and supply means disposed between said tubes for supplying air for combustion with said fuel.

In accordance with the invention each fuel vaporizing tube consists of a straight length tube into which fuel is supplied at the upstream end of the tube, said fuel being supplied tangentially to the wall so that said fuel is carried completely around the inner surface of the tube. A portion of the primary air for combustion enters the open upstream end of each fuel vaporizing tube and carries said fuel along with it whereby the fuel wets the entire inner surface of the tube. The tube is open at its downstream end and a cup-shaped member, forming part of the fuel vaporizer tube, is spaced from and is disposed coaxially across the said open downstream end, the diameter of said cap member being greater than the diameter of said tube. The fuel air mixture discharging from the downstream end of the tube strikes its cap member and said mixture is redirected by the cap member in the reverse or upstream direction externally over the tube. With this arrangement, during burner operation, the entire inner surface of each fuel vaporizing tube and its cap member is covered with a flowing supply of fuel whereby all portions of said tube and cap member are adequately cooled against the high temperatures of the combustion gases which surround the outside of said tube and cap member. In addition the effectiveness of said fuel cooling is such that the average temperatures along the walls of said tube aid cap are less than the corresponding temperatures in prior art fuel vaporizing type burners such as shown in Patent No. 2,884,759.

Other objects of the invention will become apparent upon reading the annexed detail description in connection with the drawing in which:

FIG. 4 is a developed view taken along line 4—4 of FIG. 3;

FIG. 5 is a further enlarged view of one of the fuel tubes;

FIG. 6 is a sectional view taken along line 6—6 of FIG. 5; and

Figure 1:
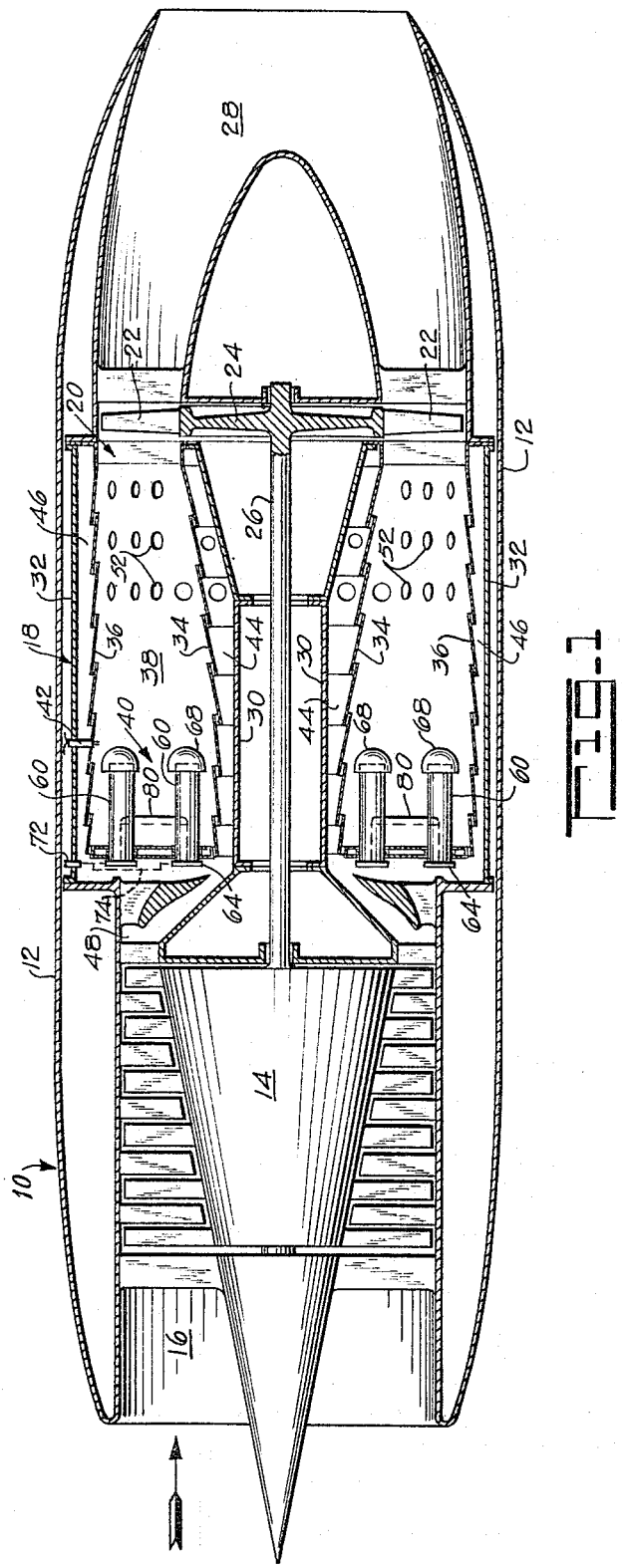
FIG. 1 is a diagrammatic view of a gas turbine engine embodying the invention.
Figure 2:
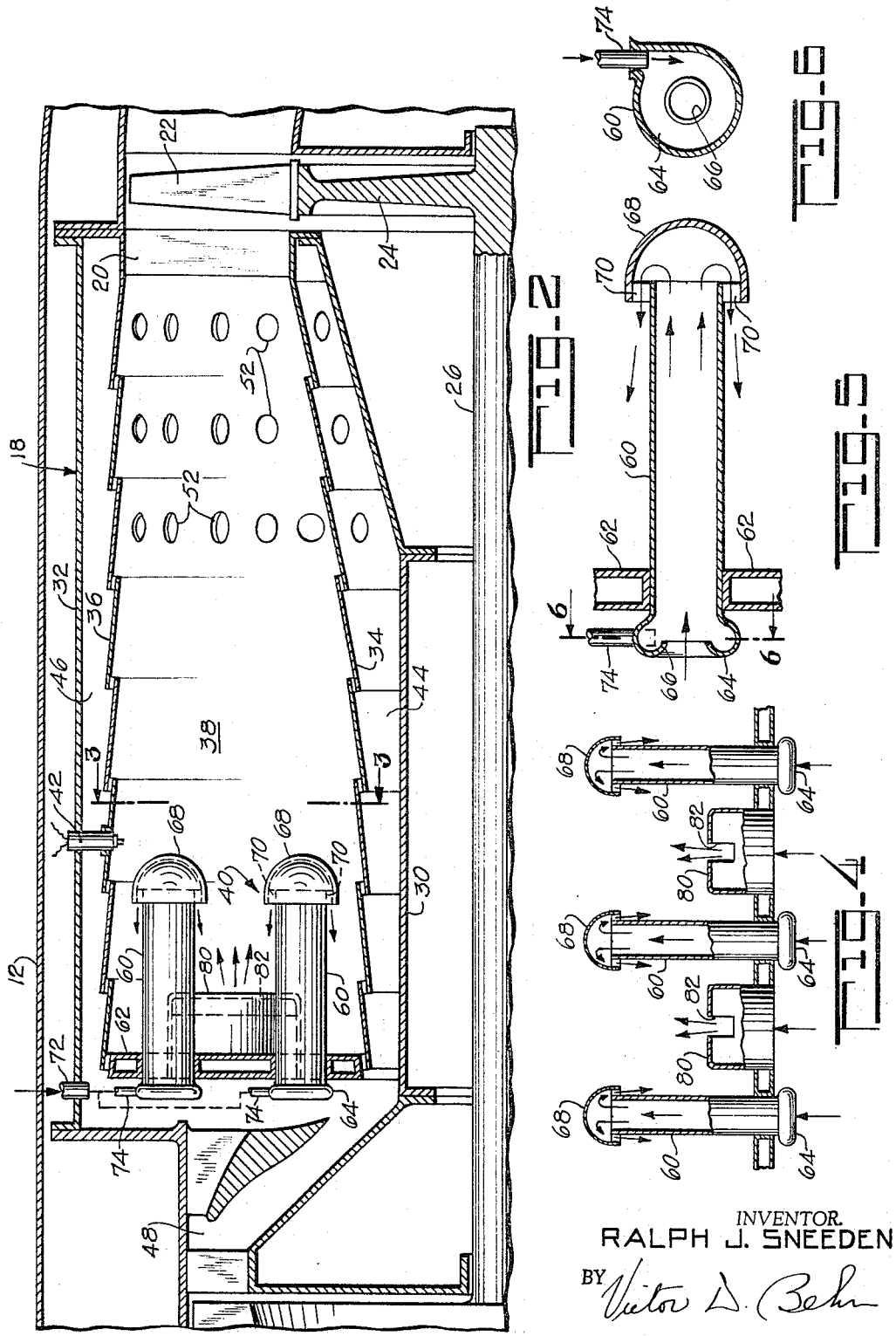
FIG. 2 is an enlarged view illustrating a portion of the combustion unit of FIG. 1.
Figure 3:
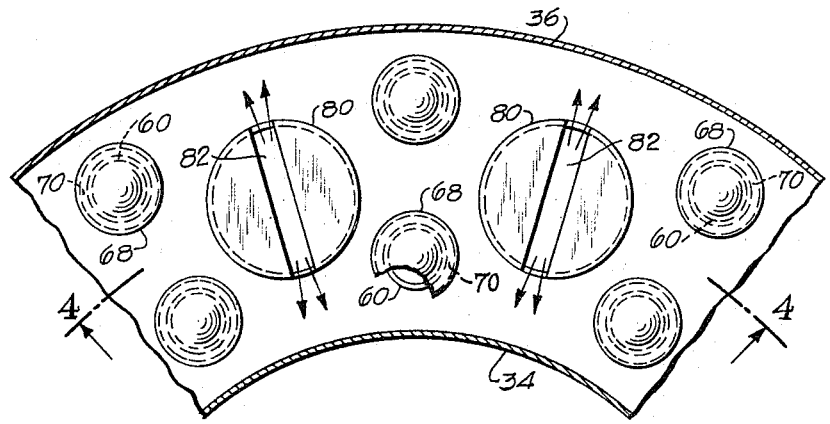
FIG. 3 is a view taken along line 3—3 of FIG. 2.

Referring to the drawing, particularly to FIGS. 1–6, a gas turbine engine is schematically indicated by reference numberal 10 as comprising a duct-like housing 12 having an air compressor 14 journaled within said housing adjacent to its forward or upstream end. The air compressor 14 receives air through an annular air inlet 16 and delivers compressed air to the combustion unit 18.

Within the combustion unit 18 air is burned with fuel and the resulting combustion gases are directed by nozzle guide vanes 20 at the downstream end of the combustion unit to the rotor blades 22 of a turbine rotor 24 for driving said rotor. Considerable air in excess of that required for combustion of the fuel is introduced into the combustion unit for lowering the temperature of the gases to a temperature at which the guide vanes 20 and rotor blades 22 are capable of operating.

A shaft 26 drivably connects the turbine rotor 24 with the air compressor 14. From the turbine blades 22 the combustion gases discharge rearwardly into the surrounding atmosphere through an exhaust nozzle 28 whereby the gas turbine engine is provided with forward propulsive thrust.

The combustion unit comprises inner and outer annular walls 30 and 32 and an inner annular liner 34 for the inner wall 30 and an outer liner 36 for the outer wall 32. The liners 34 and 36 form an annular space 38 therebetween which constitutes the combustion chamber of the unit. Fuel and primary air are supplied to the upstream end of the combustion chamber by a fuel burner structure 40 hereinafter described. The resulting fuel-air mixture is ignited by suitable ignitor means indicated as a spark plug 42. Suitable fuel primer injectors (not shown) for igniting main combustion mixture may also be provided.

The inner liner 34 is spaced from the inner wall 30 of the combustion unit to form the annular space therebetween 44 and the outer liner is spaced from the outer wall 32 to leave the annular space 46 therebetween. A portion of the compressed air supplied by the compressor to the compressor outlet passage 48 enters the annular spaces 44 and 46. A portion of this air enters the combustion chamber through slots 50 in the liners to film cool the inner surface of said liners, said slots being formed by axially-overlapping cylindrical sections of each liner as illustrated. Air from the annular spaces 44 and 46 also enters the downstream portion of the combustion chamber through relatively large holes 52 in said liners to provide the diluent or secondary air to the combustion chamber for mixing with and cooling the combustion gases before they reach the turbine nozzle guide vanes 20. The structure so far described is conventional.

Reference is now made, particularly to FIGS. 2, 3, 4, 5 and 6, for details of the fuel burner structure 40. As illustrated said structure comprises a plurality of fuel tubes 60 which are supported by an annular transverse wall 62 which closes the upstream end of the annular combustion chamber 38. Each fuel tube 60 projects through the wall 62 and is open at its upstream and downstream ends for air flow therethrough from the compressor outlet passage 48. The upstream end of each fuel tube 60 has an annular bead forming an annular interior channel 64. In addition each fuel tube 60 preferably has an inturned annular flange 66 at its upstream end to at least partially shield this channel from direct exposure to the air entering said tube. Each tube has a straight or linear configuration and has a cap member 68 disposed across its downstream end with the bottom of said cap member being axially-spaced downstream of its associated tube 60. Each cap member 68 is supported on the downstream end of its fuel tube 60 by suitable spacer means 70.

Preferably the bottom of each cap member 68 has a semi-spherical shape which connects with a generally cylindrical side wall which has a larger internal diameter than the external diameter of the fuel tube 60 and coaxially surrounds the downstream end of said fuel tube.

Fuel is supplied to each fuel tube 60 from a fuel supply conduit 72 via individual fuel lines 74 for each fuel tube 60. Each fuel line 74 enters its fuel tube tangentially into the interior channel 64 at the upstream end of said tube. With this arrangement and because of the protection afforded by the inturned annular flange 66 the fuel flows completely around said channel 64. The fuel thus entering each tube 60 is picked up by the air entering said tube and is carried along the tube whereby the fuel wets the entire inner surface of said tube. The fuel-air mixture discharges from the downstream end of each fuel tube 60 and strikes the spherical bottom of its cap member 68. The concave surface of the cap member 68 turns this fuel mixture back in an upstream direction relative to the fuel tube so that this mixture is discharged in an upstream direction externally of the fuel tube through the annular space between the cylindrical side wall of the cap member and the fuel tube. The entire inner surface of each fuel tube cap member 68 is also thereby wet by the fuel during burner operation.

Additional air is supplied through the annular upstream wall 62 of the combustion chamber for combustion with the fuel mixture discharging from the fuel tubes 60, 68. For this purpose a plurality of cup-shaped air baffle members 80 are each supported across an opening in said wall 62 so as to extend downstream from said wall. The downstream and bottom end of each cup-shaped baffle member has a slot 82 in the nature of a saw cut thereacross. Thus each slot 82 comprises an elongate portion which extends across the bottom of its cup-shaped member and portions which extend from the ends of said elongate portion a short way down the sides of said cup-shaped member.

As illustrated, the fuel tubes 60 are arranged in circumferentially-spaced pairs of tubes, with the tubes of each pair being radially-spaced from each other and with one cup-shaped baffle member 80 being provided for each adjacent two pairs of tubes and being symmetrically disposed between its two associated pairs of tubes. Also the slot across the bottom of each cup-shaped air baffle member is disposed radially relative to the axis of the annular combustion chamber. Each cup-shaped baffle member 80 is substantially shorter than the fuel tubes so that it terminates a substantial distance short of the cap member 68 of each fuel tube. Sufficient air enters the combustion chamber through the baffle members 80 so that this air together with the air entering through the fuel tubes 60 is sufficient for combustion of the fuel.

During operation of the gas turbine engine the fuel supplied to the conduit 72 is under the control of fuel flow regulating means, not shown. This fuel is discharged tangentially at low pressure into the internal chanel 64 at the upstream end of each fuel tube and as already described is carried along by the air entering each fuel tube so that an air-fuel mixture strikes the internal surface of the cap member 68 of each fuel tube. Each cap member redirects this fuel mixture back externally over the fuel tubes where said air-fuel mixture is mixed with additional air discharging from the baffle member slots 82. Air discharges in a downstream direction from the slots 82 in the baffle members in a fan-shaped pattern, the mean plane of which is substantially radial and is disposed midway between the two adjacent pairs of fuel tubes 60. This combustible mixture is ignited by suitable ignitor means such as illustrated at 42. Heat is transferred from the burning combustion gases to the fuel tubes 60 and their cap members 68 to preheat the fuel before it discharges from said tubes and cap members. The tubes 60 and their cap members 68 are generally referred to as fuel vaporizing tubes. Although some vaporization of fuel takes place in these tubes before the fuel is discharged into the combustion chamber from under their cap members, the primary function of these fuel tubes is the preheating of the fuel before it discharges into the combustion chamber. The fan-shaped downstream directed air discharge pattern from the air baffle slots 82 between the upstream directed fuel mixture discharging from the fuel tubes provides a degree of coarseness in the fuel-air mixture which promotes stability of combustion over a wide operating range. Thus said fan-shaped air pattern insures that air for combustion for the fuel discharging axially upstream from the fuel tubes is always available at the edges of this fuel discharge.

In prior art constructions, such as illustrated in prior U.S. Patent No. 2,884,759, the fuel vaporizing tubes had reverse bends with the result that at each bend the heavier fuel tended to separate from the air and run around the outside of each bend thereby leaving an uncooled or dead air region on the inside of each bend which thereby tended to burn out. No such dead air pockets or regions uncooled by fuel are found in the fuel vaporizing tubes of this invention. Thus the entire inner surface of each fuel tube and its cap member is wet by fuel during burner operation whereby said entire surface is adequately cooled by the fuel to prevent overheating of this surface.

Each cap member 68 is directly impinged by the fuel discharging from its associated fuel tube whereby this cap member is very effectively cooled and at the same time said cap member is very effective in transferring heat to the fuel. Because of the greatly improved effectiveness of the fuel vaporizing tubes 60, 68 as compared to the prior art fuel vaporizing tubes the burner structure of the present invention permits engine operation at high air temperatures to the burner without danger of the fuel tubes burning out. This feature becomes very important as aircraft engines are operated at higher and higher speeds with resulting higher air temperatures to the burner. In addition because of the greater effectiveness of the fuel vaporizing tubes 60, 68 a shorter primary combustion region is possible thereby making it possible to decrease the over-all length of the combustion unit 18.

Figure 7:
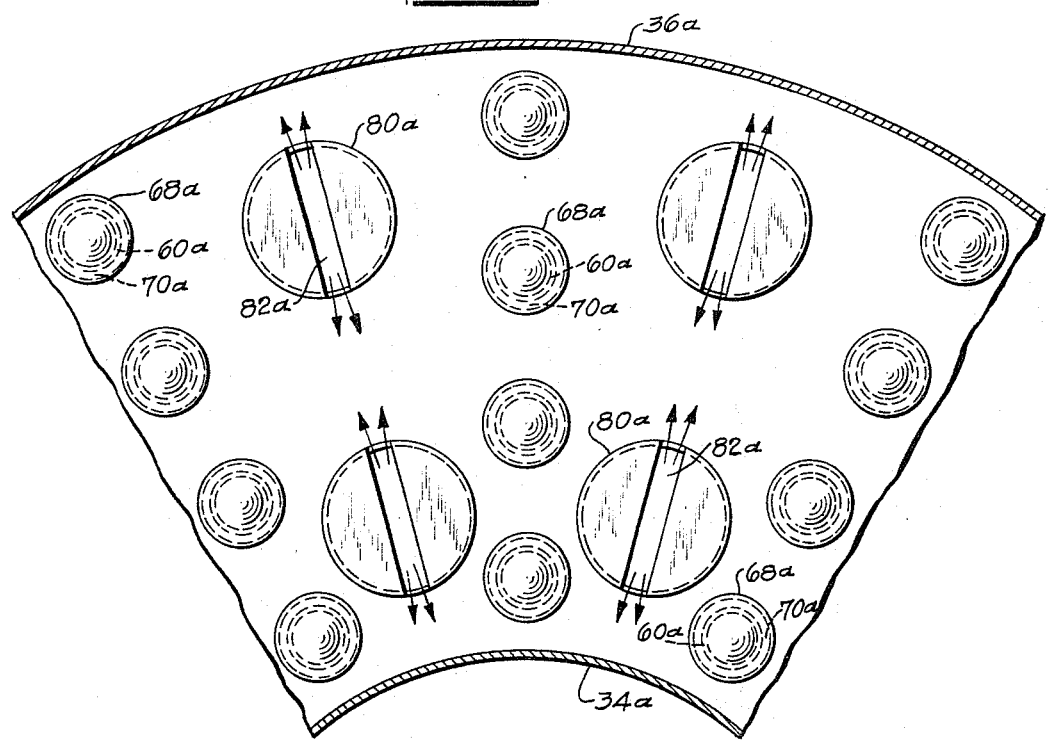
FIG. 7 is a view similar to FIG. 3 but illustrating a modified form of the invention.

The size of the fuel burner structure and associated combustion chamber can readily be increased by increasing the number of fuel tubes 60, 68 and associated air baffle cups 80. Such an arrangement is illustrated in FIG. 7. The parts of FIG. 7 have been indicated by the same reference numerals as the corresponding parts of FIGS. 1-6 but with a subscript $a$ added thereto.

In FIG. 7 the radial dimension of the combustion chamber and its upstream annular wall has been increased to accommodate a second set of fuel tubes and air baffle cups such as illustrated in FIGS. 1-6. Thus in FIG. 7 there is a circumferentially-spaced plurality of groups of four fuel tubes $60a$, $68a$ (instead of just two as in FIGS. 1-6) with the fuel tubes of each group of four fuel tubes being radially-spaced from each other so as to be disposed along a radial line. Also, between each adjacent two groups of such four fuel tubes $60a$, $68a$ there are two radially-spaced cup-shaped baffle members $80a$, the one cup-shaped baffle member $80a$ being symmetrically placed between the radially outer four fuel tubes of said two groups of four fuel tubes and the other cup-shaped baffle member $80a$ being symmetrically placed between the radially inner four fuel tubes of said two groups of four fuel tubes. FIG. 7 is otherwise similar to FIGS. 1–6 and therefore no further description of FIG. 7 is deemed necessary.

The invention has been illustrated and described in connection with an annular combustion chamber construction in which the combustion chamber 38 is formed between two radially-spaced annular liner members 34 and 36. Another conventional type of combustion unit invention consists of can-type combustion chamber elements disposed in an annular configuration for supplying combustion gases to the turbine rotor blades U.S. Patent No. 2,625,011 is an example of this latter type of combustion unit. The present invention obviously is equally applicable to this latter type of combustion unit.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

What is claimed is:

1. Combustion chamber structure comprising:
    (a) a casing forming a combustion space, said casing having a wall across its upstream end;
    (b) a plurality of circumferentially-spaced linear tubes extending downstream from said wall;
    (c) means for introducing fuel into each tube tangentially of the tube wall and adjacent to the tube upstream end, said tubes also being open at their upstream ends for air flow thereinto; and
    (d) a cap member supported across and spaced from the downstream end of each tube for directing the fuel and air discharging from said tube in an upstream direction externally of said tube from the tube discharge end.

2. Combustion chamber structure as claimed in claim 1 and including a plurality of circumferentially-spaced openings in said wall for introducing additional air for mixture with the fuel and air discharging from said tubes.

3. Combustion chamber structure as claimed in claim 1 in which each cap member has a cup-like concave surface spaced from, disposed across and facing its associated tube, the diameter of said concave surface of each cap member being greater than the external diameter of its associated tube.

4. Combustion chamber structure as claimed in claim 3 in which said concave surface of each cap member has a substantially semi-spherical bottom portion with a generally cylindrical side wall spaced from and surrounding the discharge end of its associated tube.

5. Combustion chamber structure as claimed in claim 1 in which each said tube has an inturned annular flange disposed at the upstream end of said tube upstream of the point of introduction of fuel into said tube.

6. Combustion chamber structure as claimed in claim 5 in which each cap member has a cup-like concave surface facing its associated tube, said cap member surface having a substantially semi-spherical bottom portion with a generally cylindrical side wall spaced from and surrounding the discharge end of said tube.

7. Combustion chamber structure as claimed in claim 1 in which the wall of each said tube has an annular internal channel adjacent to its upstream end with said tube having an annular inturned flange immediately upstream therefrom, and in which said fuel is introduced tangentially into said internal annular channel of each tube.

8. Combustion chamber structure comprising:
    (a) an annular casing having radially-spaced inner and outer annular walls forming an annular combustion chamber therebetween and having an annular transverse wall across the upstream end of said chamber;
    (b) a plurality of linear tubes extending downstream from said annular transverse wall, said tubes being arranged in circumferentially-spaced pairs, with the tubes of each pair being radially-spaced from each other;
    (c) means for introducing fuel into each tube tangentially of the tube wall and adjacent to the tube upstream end, said tubes also being open at their upstream ends for air flow thereinto;
    (d) a plurality of cap members, one for each said tube, with each cap member being supported across and spaced from the downstream end of its associated tube for directing the fuel and air discharging from the tube in an upstream direction externally of the tube from the tube discharge end; and
    (e) a plurality of circumferentially-spaced cup-shaped air baffle members, one for each two adjacent pairs of said tubes, with each said cup-shaped baffle member extending downstream from said annular transverse wall and being symmetrically disposed between its associated two adjacent pairs of said tubes, each of said baffle members being open at its upstream end for air flow therein and having an elongate transverse slot across its bottom for discharge of said air flow therethrough, said elongate slot being radially disposed relative to the axis of said annular combustion chamber.

9. Combustion chamber structure as claimed in claim 8 and in which each cup-shaped baffle member terminates substantially short of the cap members of the adjacent tubes.

10. Combustion chamber structure as claimed in claim 8 and in which each cup-shaped baffle member also has a pair of diametrically-disposed slots in its side walls adjacent the opposite ends of the elongate slot across the bottom of said baffle member.

References Cited by the Examiner
UNITED STATES PATENTS

| | | | |
|---|---|---|---|
| 2,771,774 | 11/1956 | Johnson | 60—39.74 |
| 2,884,759 | 5/1959 | Sevcik | 60—39.65 |
| 2,922,279 | 1/1960 | Roberson | 60—39.74 X |
| 2,941,364 | 6/1960 | Stokes | 60—39.36 X |

MARK NEWMAN, *Primary Examiner.*